(12) United States Patent
Manganelli et al.

(10) Patent No.: US 11,615,169 B2
(45) Date of Patent: Mar. 28, 2023

(54) AUTHENTICATION USING COGNITIVE ANALYSIS

(71) Applicant: INTERNATIONAL BUSINESS MACHINES CORPORATION, Armonk, NY (US)

(72) Inventors: Patrizia Manganelli, Rome (IT); Nicola Milanese, Rome (IT); Cristina Bonanni, Rome (IT); Domenico Raguseo, Rome (IT)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 16/783,552

(22) Filed: Feb. 6, 2020

(65) Prior Publication Data
US 2020/0175141 A1 Jun. 4, 2020

Related U.S. Application Data

(63) Continuation of application No. 15/713,783, filed on Sep. 25, 2017, now Pat. No. 10,592,647.

(51) Int. Cl.
*G06F 21/31* (2013.01)
*G06N 5/025* (2023.01)
(Continued)

(52) U.S. Cl.
CPC .............. *G06F 21/31* (2013.01); *G06F 21/32* (2013.01); *G06N 5/025* (2013.01); *H04L 63/08* (2013.01);
(Continued)

(58) Field of Classification Search
CPC .. G06F 21/31; G06F 21/32; G06F 2221/2101; G06F 2221/2103; G06N 5/025; H04L 63/10; H04L 63/08; H04L 63/102
(Continued)

(56) References Cited

U.S. PATENT DOCUMENTS

| 7,571,110 B2 * | 8/2009 | Tarr | G06Q 30/02 705/7.32 |
| 8,161,534 B2 | 4/2012 | Golle et al. | |

(Continued)

FOREIGN PATENT DOCUMENTS

| WO | 2007009209 A1 | 1/2007 |
| WO | 2008095011 A3 | 8/2008 |

OTHER PUBLICATIONS

Woo, Simon, Zuyao Li, and Jelena Mirkovic. "Good automatic authentication question generation." Proceedings of the 9th International Natural Language Generation conference. 2016. (Year: 2016).*

(Continued)

*Primary Examiner* — Syed A Zaidi
(74) *Attorney, Agent, or Firm* — Anthony M. Pallone

(57) ABSTRACT

A method for dynamically authenticating and granting access to a computing system may be provided. The method comprises deriving at least one authentication question from at least one identified fact contained in a received text data. The at least one identified fact is stored in a knowledge base relating to a user profile. The method comprises conducting a textual authentication dialog. The textual authentication dialog comprises presenting the at least one authentication question and determining, based on natural language processing, that a received response comprises the at least one identified fact from which the at least one authentication question has been derived. The method comprises granting access to the computing system based on the textual authentication dialog.

18 Claims, 9 Drawing Sheets

(51) Int. Cl.
H04L 9/40 (2022.01)
G06F 21/32 (2013.01)

(52) U.S. Cl.
CPC ............ H04L 63/10 (2013.01); H04L 63/102 (2013.01); *G06F 2221/2101* (2013.01); *G06F 2221/2103* (2013.01)

(58) Field of Classification Search
USPC .......................................................... 726/5
See application file for complete search history.

(56) References Cited

U.S. PATENT DOCUMENTS

| | | | |
|---|---|---|---|
| 8,515,847 B2 | 8/2013 | Schultz | |
| 8,955,058 B2 | 2/2015 | Castro et al. | |
| 9,147,054 B1 | 9/2015 | Beal | |
| 9,311,461 B2 | 4/2016 | Basson et al. | |
| 9,317,670 B2 | 4/2016 | Gudlavenkatasiva et al. | |
| 9,444,804 B2 | 9/2016 | Meltzer | |
| 9,722,996 B1* | 8/2017 | Kolman | H04L 63/083 |
| 2002/0178122 A1 | 11/2002 | Maes | |
| 2006/0190985 A1 | 8/2006 | Vasishth | |
| 2007/0214354 A1 | 9/2007 | Renaud | |
| 2007/0271466 A1* | 11/2007 | Mak | G06F 21/316 |
| | | | 713/184 |
| 2007/0283416 A1 | 12/2007 | Renaud | |
| 2008/0098464 A1* | 4/2008 | Mizrah | G06F 21/36 |
| | | | 726/5 |
| 2008/0133716 A1* | 6/2008 | Rao | H04L 67/306 |
| | | | 709/227 |
| 2009/0288150 A1* | 11/2009 | Toomim | G06F 21/6218 |
| | | | 726/5 |
| 2010/0223105 A1* | 9/2010 | Gassewitz | G06Q 30/0201 |
| | | | 705/7.29 |
| 2011/0191838 A1 | 8/2011 | Yanagihara | |
| 2013/0073628 A1* | 3/2013 | Barber | H04L 67/306 |
| | | | 709/204 |
| 2014/0304505 A1* | 10/2014 | Dawson | G06F 21/6227 |
| | | | 713/165 |
| 2015/0150104 A1 | 5/2015 | Melzer | |
| 2015/0172276 A1 | 6/2015 | Guiney | |
| 2016/0275278 A1 | 9/2016 | Cecchi | |
| 2016/0275302 A1* | 9/2016 | Cecchi | G06F 21/32 |
| 2019/0095596 A1 | 3/2019 | Manganelli et al. | |

OTHER PUBLICATIONS

Simon Woo, Elsi Kaiser, Ron Artstein, and Jelena Mirkovic. 2016. Life-experience passwords (LEPs). In Proceedings of the 32nd Annual Conference on Computer Security Applications (ACSAC '16). ACM, New York, NY, USA, 113-126 (Year: 2016).*

NPL Search Terms (Year: 2022).*

Roy, et al., "Enhanced Knowledge-Based User Authentication Technique Via Keystroke Dynamics", International Journal of Engineering Science Invention, Sep. 2014, pp. 41-48, vol. 3, Issue 9, Department of Computer Science and Engineering, University of Calcutta, India.

Woo et al., "Life-experience passwords (LEPs)", Proceedings of the 32nd Annual Conference on Computer Security Applications (ACSAC '16), ACM, New York, NY, USA, pp. 113-126, Dec. 2016.

Woo et al., "Good automatic authentication question generation", Proceedings of the 9th International Natural Language Generation Conference, Sep. 5-8, 2016, pp. 203-206.

IBM: List of IBM Patents or Patent Applications Treated as Related (Appendix P), Feb. 5, 2020, pp. 1-2.

* cited by examiner

AUTHENTICATION USING COGNITIVE ANALYSIS

BACKGROUND

The present invention relates to the field of computer access control, and more specifically, to dynamically authenticating and granting access to a computing system using cognitive computing.

In computer security, general access control includes identification, authorization, authentication, access approval, and audit. Authentication and access control are often combined into a single operation, such that access is approved based on successful authentication, or based on an anonymous access token. Authentication methods and tokens may include passwords, biometric scans, physical keys, electronic keys and devices, hidden paths, social barriers, and monitoring by humans and automated systems.

BRIEF SUMMARY

According to one aspect of the present invention, a method for dynamically authenticating and granting access to a computing system may be provided. The method may include receiving text data, identifying at least one fact comprised in the text data by performing natural language processing on the text data, and storing the identified fact in a knowledge base relating to a user profile.

The method may further include deriving at least one authentication question from the stored fact and conducting a textual authentication dialog. The dialog may include presenting the at least one authentication question, receiving a response, analyzing the response using natural language processing, and determining, based on the analysis, whether the response may include the stored fact from which the authentication question has been derived.

Moreover, the method may include granting access to the computing system, presenting an enrichment question and receiving a related answer.

According to another aspect of the present invention, a dynamic user authentication system for dynamically authenticating and granting access to a computing system may be provided. The system may include a receiving unit adapted for receiving text data, a natural language processing unit operable for identifying at least one fact comprised in the text data, and a knowledge base module operable for storing the identified fact in relating to a user profile.

Additionally, the system may include a deriving module adapted for deriving at least one authentication question from the stored fact and a chat module adapted for conducting a textual authentication dialog. The dialog may include presenting the at least one authentication question, receiving a response, analyzing the response using natural language processing, and determining, based on the analysis, whether the response includes the stored fact from which the authentication question has been derived.

Furthermore, the system may include a granting unit adapted for granting access to the computing system. Moreover, the chat module may also be adapted for presenting an enrichment question and receiving a related answer.

It may be noted that the computing system may be a computer system or a communication system or a combination of both.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
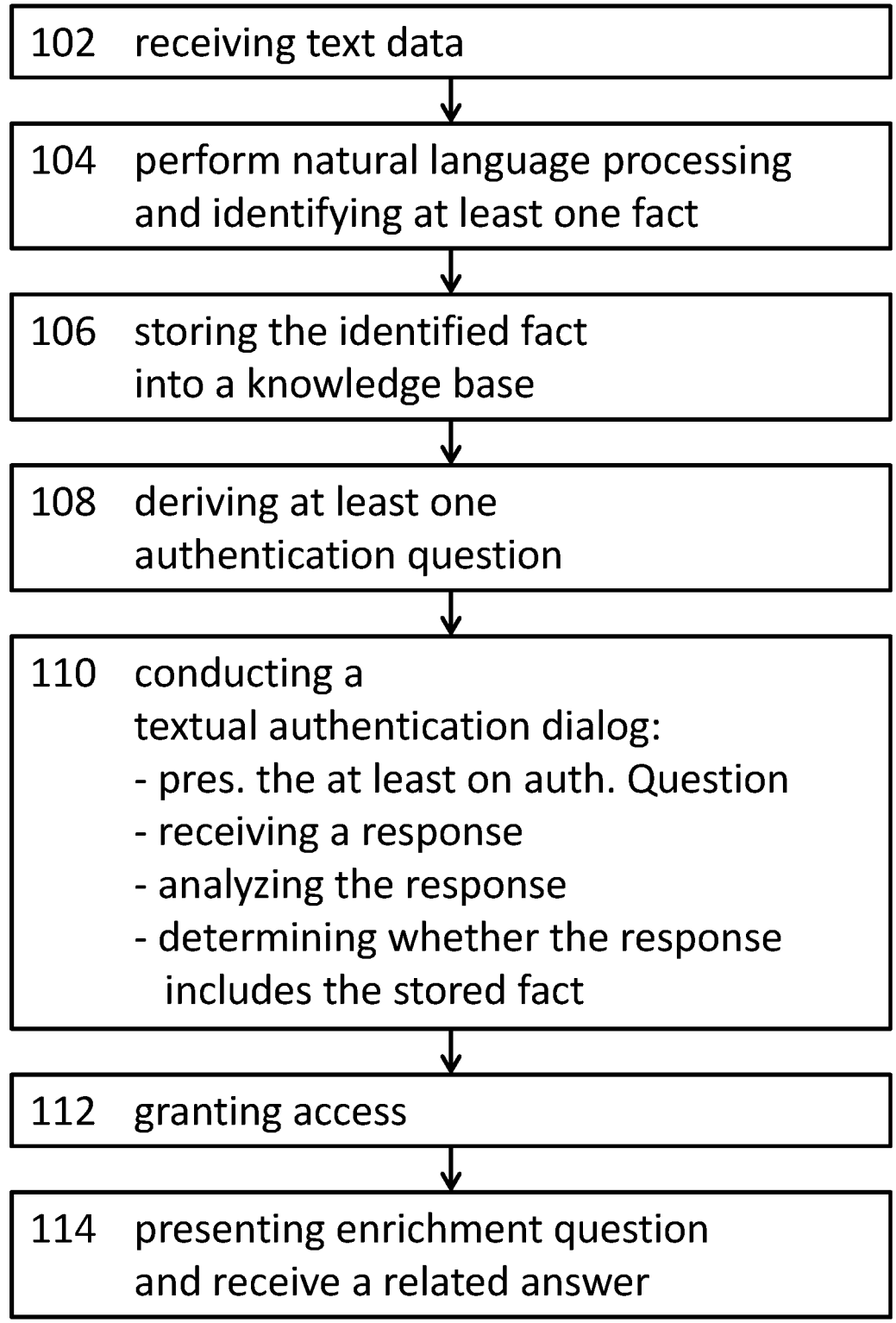
Figure 2:
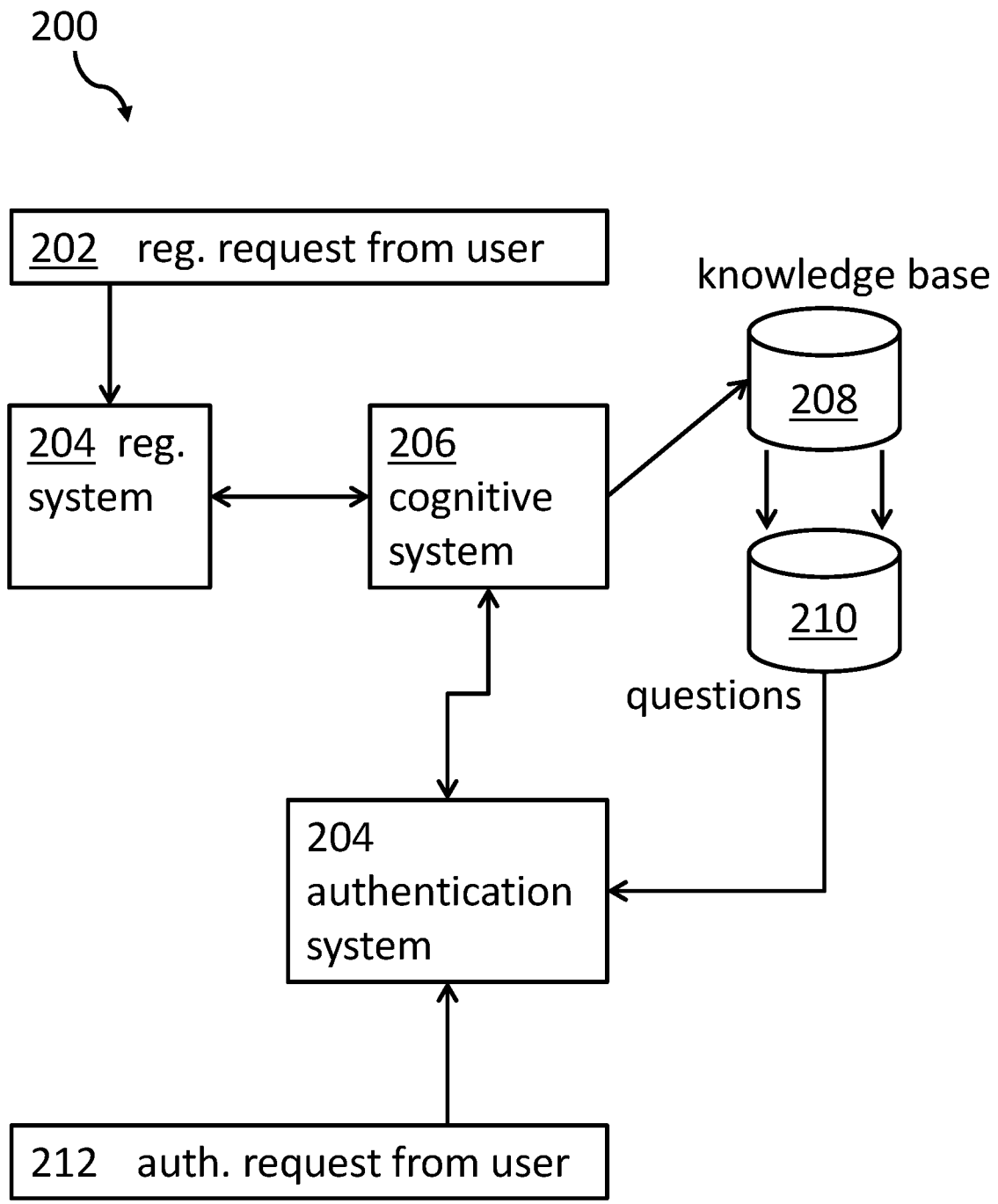
Figure 3:
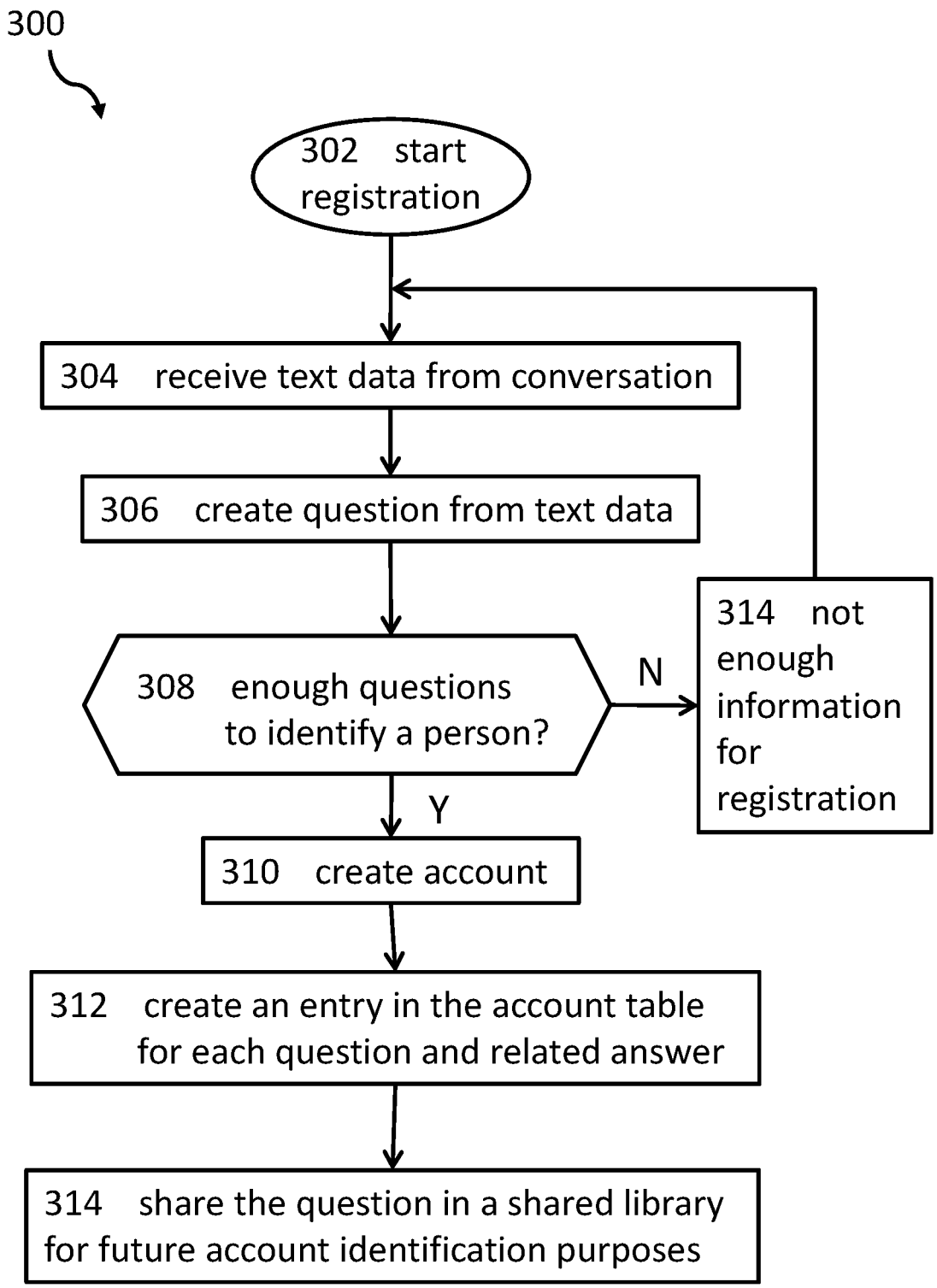
Figure 4:
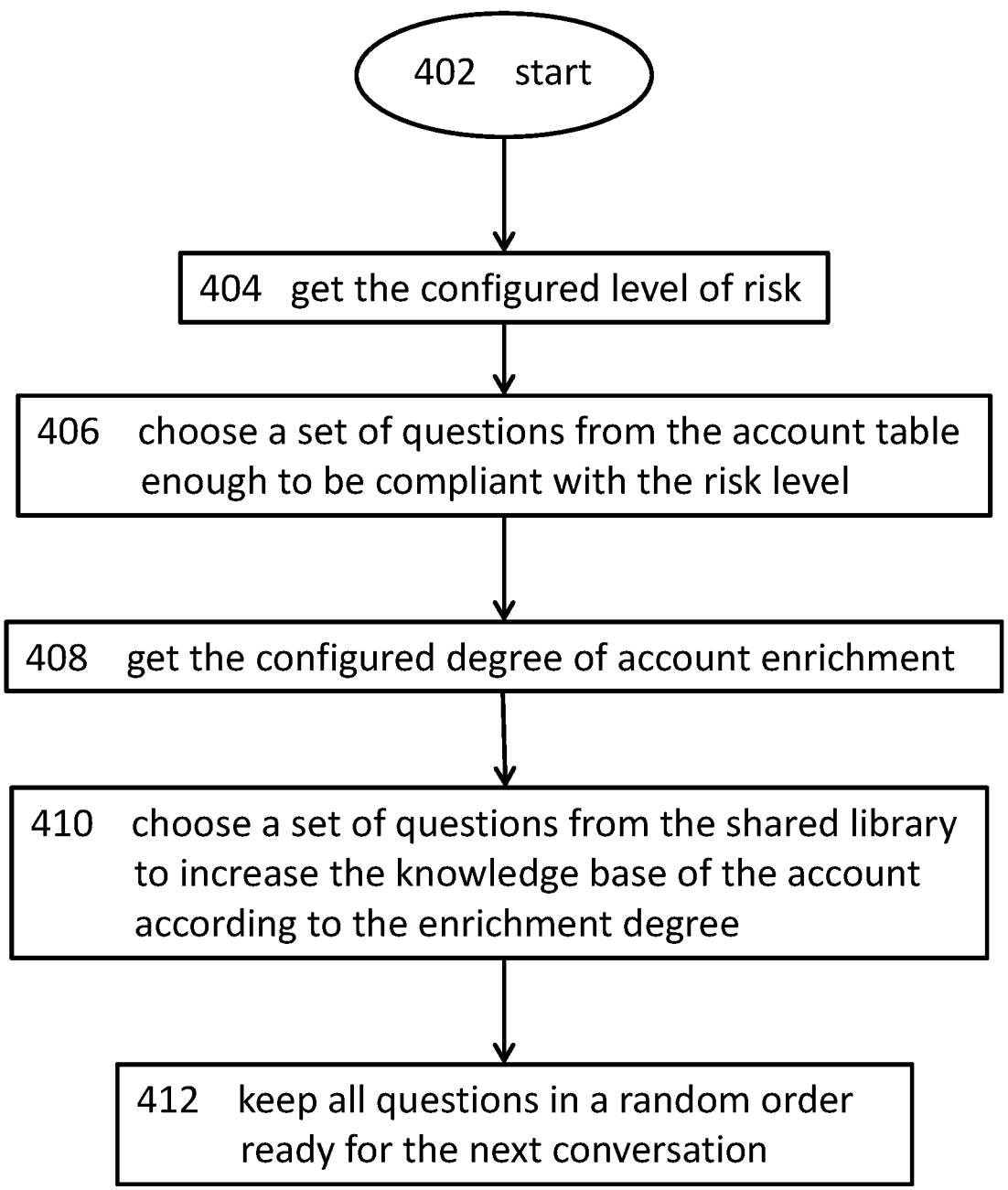
Figure 5:
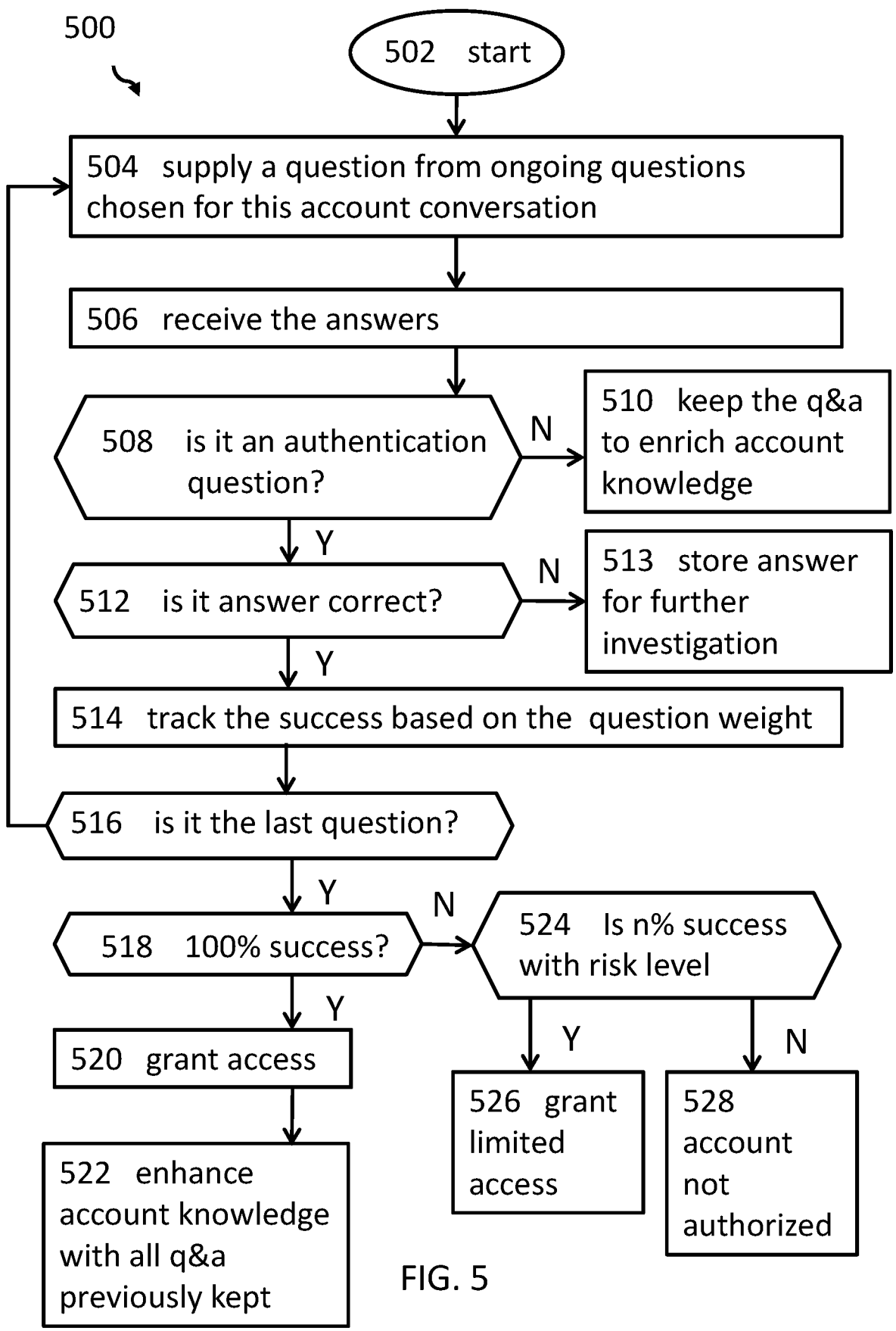
Figure 6:
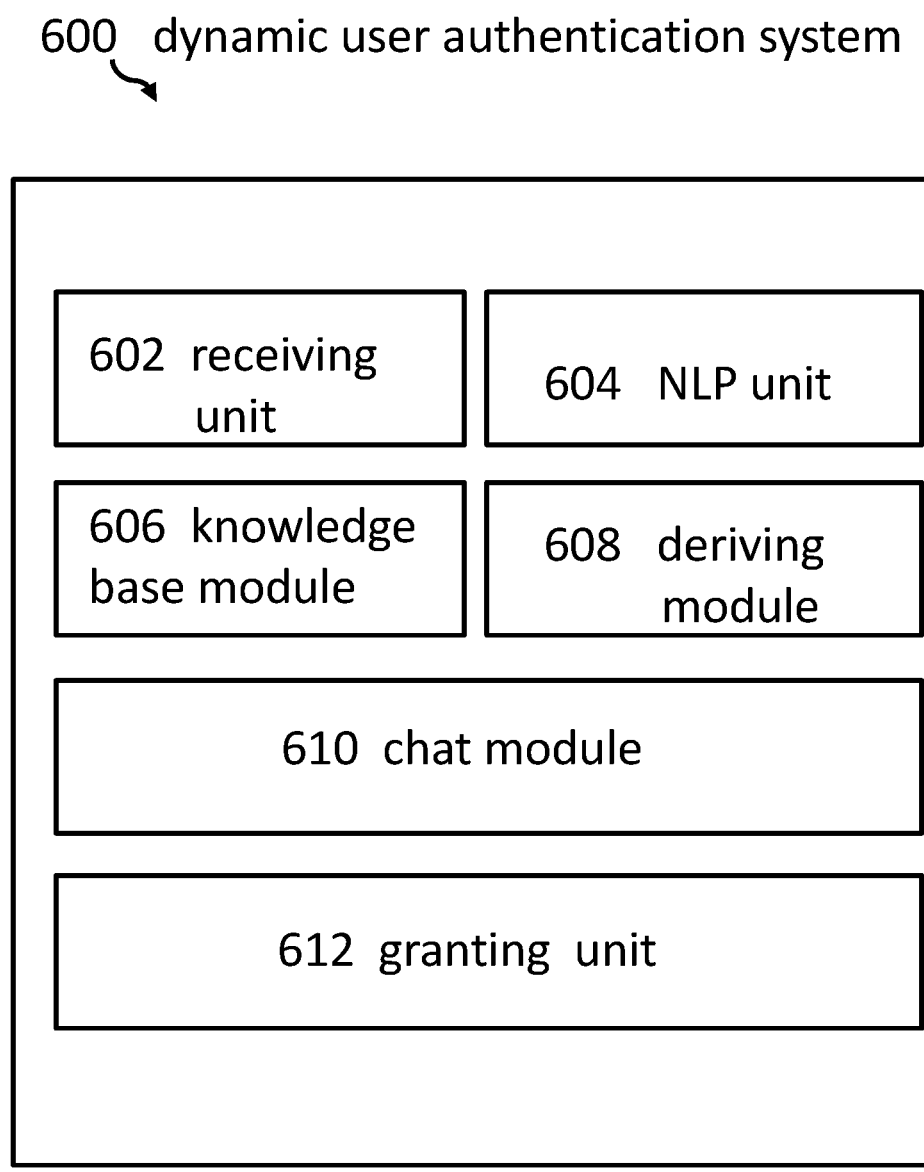
Figure 7:
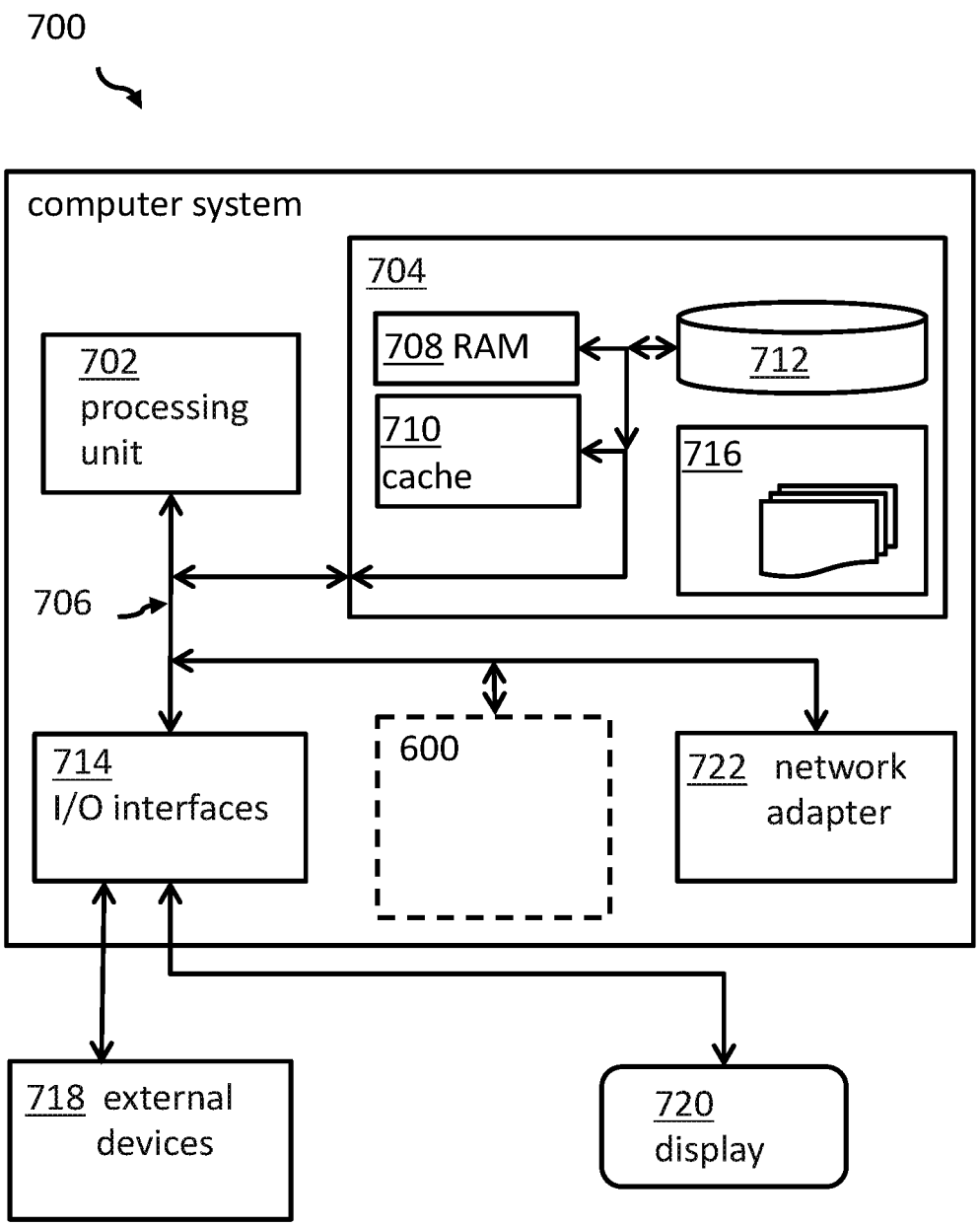
Figure 8:
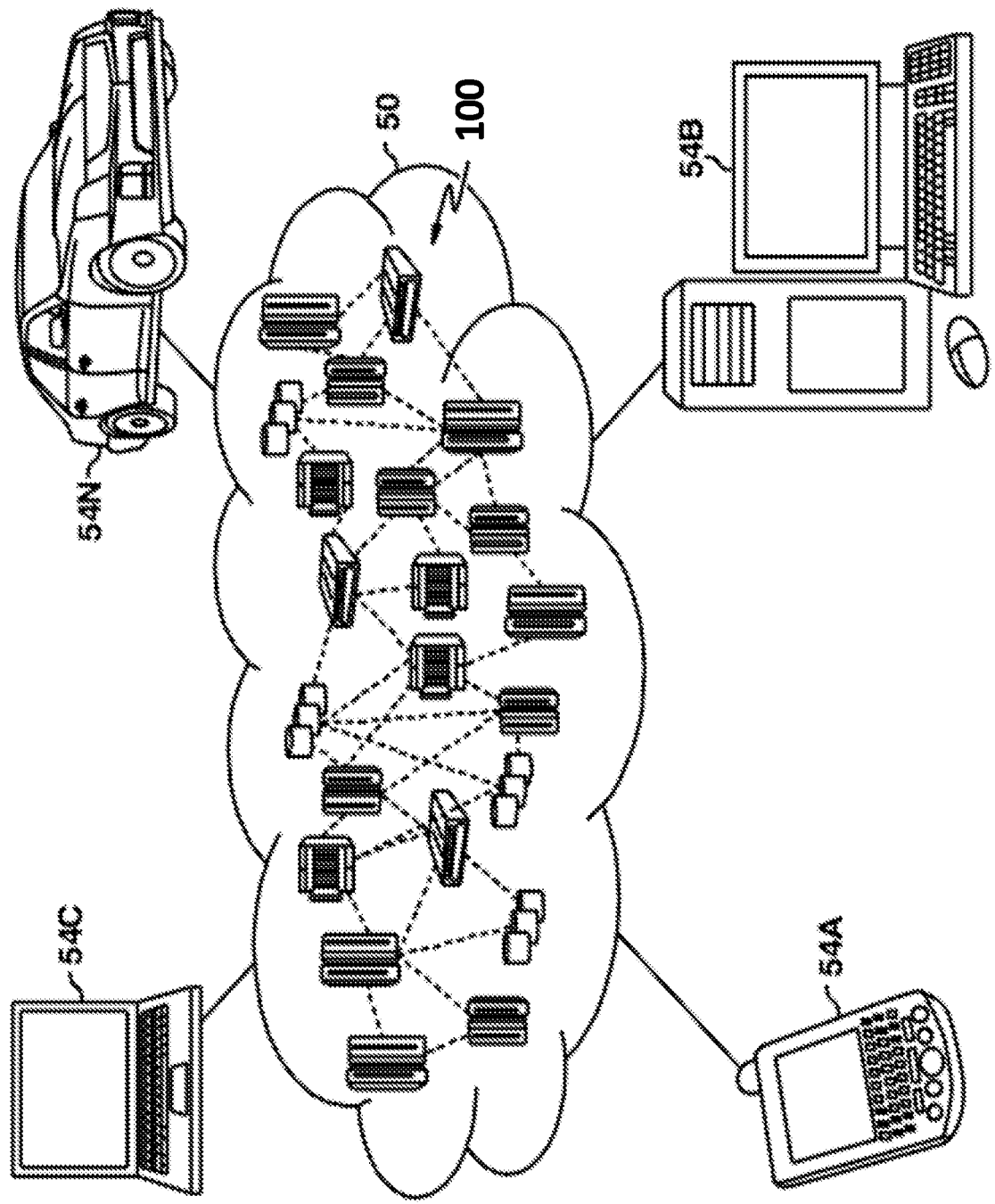
Figure 9:
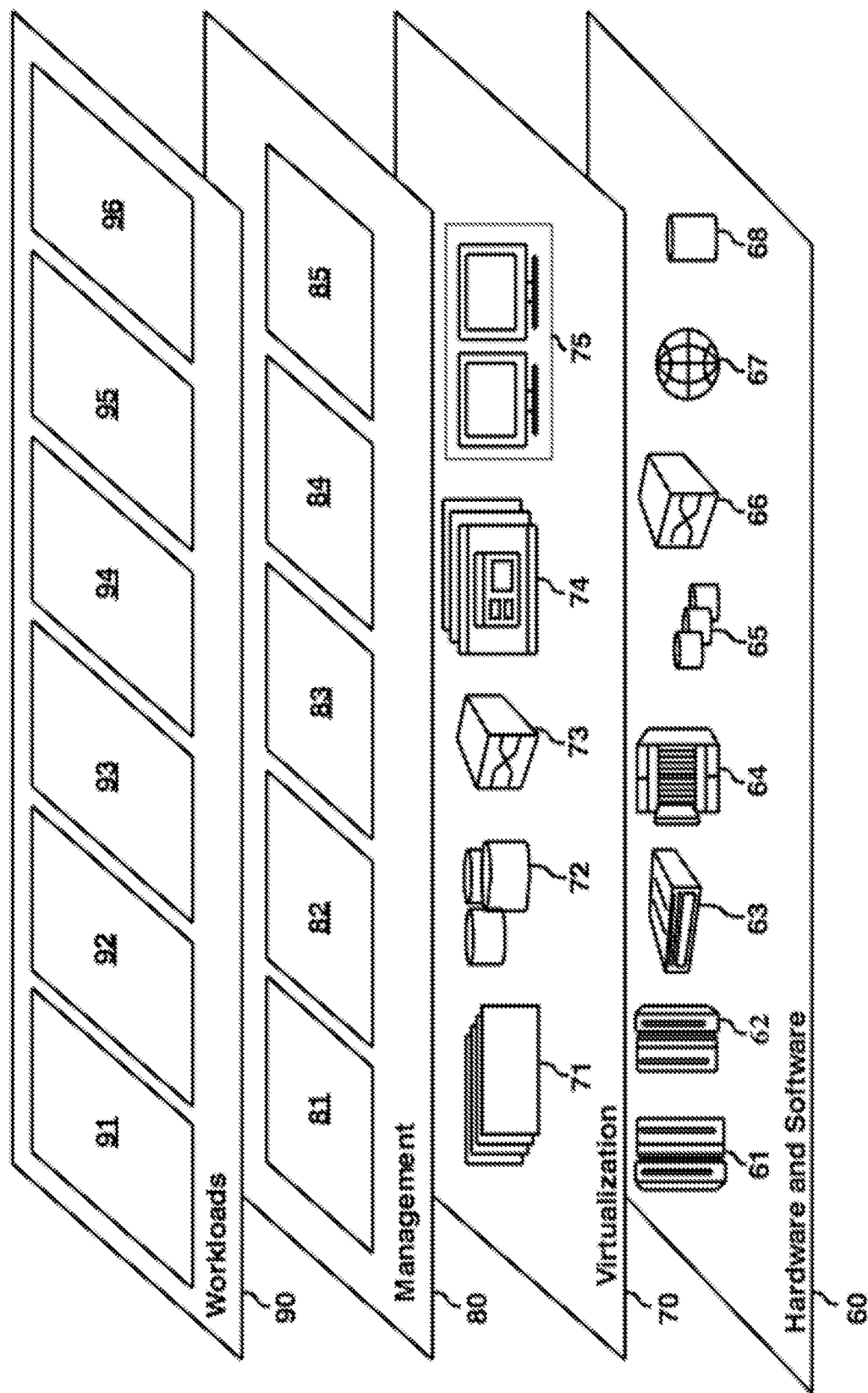

Preferred embodiments of the invention will be described, by way of example only, and with reference to the following drawings:

FIG. 1 shows a block diagram of an embodiment of the inventive method for dynamically authenticating and granting access to a computing system;

FIG. 2 shows a block diagram of an embodiment of an architecture for the inventive system;

FIG. 3 shows a block diagram of an embodiment of a registration process;

FIG. 4 shows a block diagram of an embodiment for enriching the knowledge base;

FIG. 5 shows a block diagram of an embodiment of the authentication phase of the process;

FIG. 6 shows an embodiment of a block diagram of the dynamic user authentication system;

FIG. 7 shows an embodiment of a computing system comprising the dynamic user authentication system;

FIG. 8 shows a cloud computing environment in accordance with an embodiment of the present invention; and FIG. 9 shows abstraction model layers in accordance with an embodiment of the present invention.

DETAILED DESCRIPTION

Protecting data and controlling access in data processing environments becomes increasingly important in data centers, as well as for individual users. With the increase of cloud computing environments, the need to protect data against unauthorized access is paramount for these more and more dominant computing architectures. Hence, computer security imposes increasingly safer and more complex user passwords and authorization methods. Different kinds of remote or local access utilize a password and users are strongly suggested to use different passwords for the different system they need to access, and especially to use complex passwords, which are difficult to be guessed by an intruder. However, such complex passwords for a plurality of different computer systems are also difficult to remember for the user.

Solutions to this problem have been attempted by introducing different new techniques like single sign on, strong authentication methods based on tokens and instant messages or password portfolios. Unfortunately, all of this is not always possible and sometimes is inconvenient in an environment containing many different applications, devices and security needs. Very often, the user is tempted to use just one password or at least a limited number of passwords which, in some cases, may include an internal logic. A recently published report has stated that the majority of passwords are trivial and the most common ones are just a repetition of one number (999999, 888888, . . . ). Sometimes, the user who does not remember a password may solve the problem by creating new credentials generating other kinds of problems, like credentialed proliferation and complex identity management. Other methods, like face recognition or fingerprint recognition, have been tried to increase the access security to computer systems, communication systems and data. However, this may be a too strong access limitation because devices for face recognition of fingerprint recognition are not always available at all access devices.

In the context of this description, the following conventions, terms and/or expressions may be used:

The term 'dynamically authenticating and granting access' may denote a method controlling a secure access to a computing system and/or a communication system and/or data stored and/or services available from a computing or communication system of any kind. In this context, the term "dynamic/dynamically" may have different meanings: firstly, the underlying authentication method is not static, in particularly, by not using always the same username and password. On the other side, it may be noted that the access method may vary in time and context. Thus, every time the user wants to have access to the computing system, the user may be asked different questions out of the life context of the user. The user may also be able to answer the questions in natural language, and thus not in a strictly formalized way. The related authentication system may be able—particularly by using natural language processing, machine learning and artificial/augmented intelligence—to dynamically extract the facts from the answers of the user.

The term 'computing system' may denote any kind of computer system and/or communication system, like a personal computer, a cloud computing service, a tablet computer, a mobile/smart phone, a storage system and comparable computing systems which may require a dedicated authentication before accessing the services of the computing system.

The term 'text data' may denote a free "natural" text paragraph. There may be no need to structure the text in a predefined way. In the sense, the text data may be classified as unstructured data in contrast to structured data typically accessible from a database using a standard query language like, SQL (structured query language). This may allow great freedom in a human centric human/machine interface for access control to computing resources.

The term 'fact' may denote—based on commonsense—something that is postulated to have occurred or to be correct. The usual test for a statement of facts is verifiability—that is, whether it can be shown to correspond to experience.

The term 'natural language processing' (NLP) may denote a field of computer science, artificial intelligence (AI) and computational linguistics concerned with the interactions between computers and human (natural) languages, and, in particular, concerned with programming computers to fruitfully process large natural language corpora. Instrumental for natural language processing may be the usage of cognitive computing in order to extract facts from unstructured data, like a human generated text comprising words, phrases and sentences. The AI support for the NLP may be implemented using known technologies like classifications, knowledge graphs, words clouds, specific ontologies, dictionaries, thesauruses, etc.

The term 'knowledge base' may denote data stored in an organized way in a storage system. The data may have a complex or so-called "unstructured" structure. The knowledge base may be implemented in form of a database for unstructured data. However, also relationships between facts and related questions may be stored as metadata in the knowledge base. Underlying object models—often called ontology—may be used to organize the data, i.e., facts and related questions. Generally, a knowledge graph comprises nodes (the facts) and edges (the relations between the facts).

The term 'authentication question' may denote a question presented from an authentication system to a user wanting to have access to a specific computing system. The authentication question may be based on a knowledge base in which questions and potentially related facts have been stored before. This way, the authentication system may have the basis for a determination whether the authentication question has been answered correctly. Different types of authentication questions—as explained above—may be presented to the user.

The term 'textual authentication dialog' may denote a human/machine question and answer interaction in which an authentication system poses or presents questions to a user. The user may have to answer the questions. The textual authentication dialog may be text-based—in particular, using words, phrases and/or sentences typed using a keyboard—or voice based using a voice interface, like a microphone and a loud speaker or a headset.

The term 'question answering technology' may denote here a computer science discipline within the fields of information retrieval and natural language processing (NLP), which is concerned with building systems that may require answering questions posed by a system in a natural language to a human.

A question answering implementation may construct its questions by querying a structured database of knowledge or information, usually a knowledge base. More commonly, question answering systems may determine or generate questions from an unstructured collection of natural language documents.

The term 'chat'—in particular online chat—may denote to a kind of real-time transmission of text messages from a sender to a receiver (forth and back). The related chat messages may generally be short in order to enable participants to respond quickly. Thereby, a feeling, similar to a spoken conversation, is created which may distinguish chatting from other text-based online communication forms such as email or Internet forums. The text and/or also voice based chat, used in the context of this document may be the basis for a very convenient way of a user to identify him and to enable a user authentication by the related dynamic authentication system. Previous forms of authentication with user ID and password may no longer be required.

The proposed method for dynamically authenticating and granting access to a computing system may offer multiple advantages and technical effects:

It may release a user from remembering a growing number of passwords for a growing number of different computing and/or communication systems. The computing system will be enabled to identify and authenticate access to the computer system using a personal context of the user wanting access to the computing system. The data related to the personal context of the user are not those already stored on a storage system of the computing system—e.g., from documents or email traffic. However, the related context data may be stored separately and independently from the computing system in question so that a potential unauthorized access to the computer system may not allow access to potential context data for a next unauthorized access of a potential intruder.

The context data, i.e., facts and related questions, may be managed dynamically. This means that they—and consequently the related knowledge base—may be constantly enhanced every time the user may access the computing system. These facts and questions may not relate to any content stored in the computing system directly. They may be stored in a separated authentication system and may relate to a personal context of the user wanting the access. Thus, the system does not rely on a pre-formulated question and answer dialog, but is enhancing a "living" knowledge base about the user.

As a consequence, an authentication system may be implemented using different levels of access depending on a predefined risk level. For example, a user may be granted only limited access to services available on the computing system if not all questions posed to the user and answered are correct. It may also be possible to share potential questions for enhancing the knowledge base by using questions (not answers) of other users. Thus, over time, a clearer and clearer picture, i.e., a pattern, of the user may be generated over time such that—by selecting completely unrelated questions—the access security, i.e., data and service protection—grows. The proposed method may also allow presenting different kinds or types of questions to the user: multiple-choice type questions, questions requiring a Boolean answer or completely open questions (phrase type questions).

The usage of a cognitive system—i.e., artificial intelligence, augmented intelligence—in the form of a natural language processing system may guarantee a more convenient access to computing and communication systems, as well as data, by a user because it is no longer required to remember any passwords. The proposed method and system may also respect privacy because it may be implemented such that a user may revoke an enhancement question for any reason or based on personal preferences.

In the following, additional embodiments of the method will be described that may also be applicable to the related system.

According to a preferred embodiment of the method, performing the natural language processing on the text data may include determining whether the length of the text data exceeds a predefined threshold length. Thus, during the registration process the user needs to deliver a minimum amount of content and context and a related minimum number of derivable facts. This may be a guarantee for an initial level of security. Consequently, and according to another preferred embodiment, the method, performing the natural language processing on the text data, may include determining whether the number of identified facts exceeds a fact threshold number. Based on this, a minimum number of questions may be derived for an initial secure logon procedure.

As one example, it may be required that the first step of the authentication system may be performed to identify and distinguish the user from all other registered users in the system. Therefore, e.g., the new user may need to disclose his name, his date of birth and the place where he lives.

Examples of initial enhancement questions may be whether the user may ever have done a foreign money transfer, to whom and/or to which city. These questions may be based on previous chat sessions of other users, i.e., access grant sessions. Additionally, the questions may also be directed to a pet of the user, its name, etc.

According to an advantageous embodiment of the method, the knowledge base may be separated from the computing or communication system. This may allow hiding facts and the related questions for a potential intruder if such an attacker may have access to the computing or communication system. He will simply not find the context data of the user.

According to another advantageous embodiment of the method, the natural language processing includes using a cognitive computing system—in particular an artificial intelligence system or an augmented intelligence system—using a question answering technology. It may be based on word trees, semantic analysis, computational linguistics and machine learning. Also, statistical methods may be applied. Hence, the latest technology available may be used in order to allow a convenient access to computing systems for users.

According to one useful embodiment of the method, the enrichment question may be equal to a question of another user profile which is different to the user profile. This may allow using the combined knowledge base of all users for a wide variety of different enhancement questions. This way, a self-learning capability may be implemented into the related authentication system which in turn may increase the dynamic character of the proposed method and system.

According to an optional embodiment of the method, the granting access to the computing system may include granting access according to an access level corresponding to a predefined risk level. Thus, a different number of access questions may be asked to the user by the authentication system depending on the predefined risk level. In addition, it may be possible to also grant access to a limited number of services and/or data of the computing system in case one—potentially more than one—question may have been answered incorrectly. This means that the proposed authentication system may be able to adapt dynamically to changing risk levels—i.e., security requirements—as well as to changing abilities of the user to remember the correct answers, i.e., facts, to the questions stored in the knowledge base of the authentication system.

According to a further permissive embodiment, the method may also include controlling the granting access according to an access level depending on a sum of weight factors of correctly received responses. Hence, different types of questions—Boolean, multiple-choice, complex, more recent, etc.—may have different weight factor values. These weight factor values resulting from the answers may be added in order to determine a combined weight factor value which may be compared to weight factor values required for a certain, predefined risk level. This way, the access to the system may be fine-tuned by assigning different weight factor values to different types of questions and to different fact categories of the questions posed or presented to the user. The weight factor values may be assigned to the different facts and questions using predefined rules reflecting the edge of a fact/answer pair, recent changes in the life of the user, actual environmental context data, etc.

According to an additionally advantageous embodiment of the method, at least one of the authentication questions may include the enhancement question. This way it may be guaranteed that the most recent context of the user may be used for the authentication of the user. Thus, this question may have a relative high weight factor if compared to other facts and related questions. Also under this perspective, the authentication method and the related system can be denoted as dynamic because the weight factors may be assigned dynamically, i.e., depending on the time the fact and the related question entered the knowledge base.

According to a preferred embodiment of the method, any of the authentication questions may be of a type selected out of the group including a Boolean type question, a multiple-choice type question and phrase type—in particular a complex—question. The phrase may denote here a specific word or a complete phrase, i.e., a predefined sequence of words.

According to another advantageous embodiment of the method, receiving the text data and/or presenting the authentication question and/or receiving a response is performed using audio or chat based data. This may guarantee a dialog form adapted to the capabilities of the used device for accessing a computing system and its related services, as well as the environment in which the user wants to have access to the computing system. If, for example, the user may drive a car, the audio interface may be more appropriate than a text-based dialog. In another environment—e.g., an Internet café—a silent dialog, i.e., text-based chat dialog, may be more appropriate. Also under this aspect, the identification system may be denoted as dynamic because it may be able to adapt itself to changing environments of the user wanting access to the computing or communication system.

In the following, a detailed description of the figures will be given. All instructions in the figures are schematic. Firstly, a block diagram of an embodiment of the inventive method for dynamically authenticating and granting access to a computing system is given. Afterwards, further embodiments and implementation details, as well as embodiments of the dynamic user authentication system, will be described.

FIG. 1 shows a block diagram of an embodiment of the method 100 for dynamically authenticating and granting access to a computing system—in particular a computer, an information or communication system. The method includes receiving, step 102, text data, e.g., in the form of free text, created by a user. The text data may be used for the initial identification and/or registration of a new user to the system. The method 100 also includes identifying, step 104, at least one fact comprised in the text data by performing natural language processing on the text data. Cognitive computing, augmented or artificial intelligence systems may be used for this task. Furthermore, the method 100 includes storing, step 106, the identified fact in a knowledge base relating to a user profile, deriving, step 108, at least one authentication question from the stored fact, and conducting, step 110, a textual authentication dialog—in particular a chat dialog with a user. The chat dialog includes presenting the at least one authentication question by an authentication system, receiving a response from the user, analyzing the response from the user using natural language processing, and determining, based on the analysis by the authentication system, whether the response comprises the stored fact from which the authentication question has been derived.

Additionally, the method 100 includes granting, step 112, access to the computing system, potentially according to a risk level. Furthermore, the method may include presenting, step 114, an enrichment question and receiving a related answer. The enrichment question and the related answer may be stored together with the answer in the knowledge base for a next time usage, i.e., for the next access to the computing system.

FIG. 2 shows a block diagram of an embodiment of an architecture 200 for the inventive system. A user may generate a registration request 202 which may be received by a user interface to the registration system 204. The initial request may include the text data for an initial identification of a user. Alternatively, the cognitive system 206 which may be operable for natural language processing may request such text data via the user interface of the registration system from the user who wants to register. The related dialog between the user and the registration system may either be based on a text-based chat or a voice-oriented interaction—in particular voice input/output. As described above, the cognitive system 206 will identify and isolate facts used to identify a user. These facts may be stored in the knowledge base 208. Out of these facts questions 210 will be generated or derived—and, in particular, also be stored in the knowledge base 208. Alternatively, the questions may be generated "on-the-fly" based on the facts stored in the knowledge base 208. After an initial interaction between the registration system 204 and the user, a basic set of facts and questions may have been determined/derived and stored in the knowledge base 208.

In a second phase, the user may want to access a computing system (not shown in FIG. 2) and may want to use the here proposed authentication method. The authentication request 212 from the user is received by the authentication system 204—which may work together with the cognitive system 206, the knowledge base 208 and the questions 210, the authentication system 204 may interact with the user in a chat-like form—based on the question answering technology implemented using the cognitive system 206—in order to identify and authenticate the user's access to the computing system.

FIG. 3 shows a block diagram of an embodiment of a registration process 300. The registration process starts at 302. Text data is received from a chat conversation, 304. Next, 306, the questions relating to the text data and the isolated facts are created, generated or determined. In a next step, 308, the system will determine whether enough questions may be generated to identify a person or a user. If that is the case—case "Y"—a user account will be created, 310. This may involve creating a profile for the user including pointers to the knowledge base—in particular to specific questions and facts, compare 312. In order to get enough facts about a user requesting access, questions (questions only) may be shared, 314, from profiles of other users. If the user may then answer these questions, it will lead to user specific facts for future access requests.

In case not enough questions are available to identify a person—case "N"—the system may generate an error message indicating "not enough information for registration", 314, and return to the step of receiving text data from a conversation, 304, i.e., initial registration.

FIG. 4 shows a block diagram 400 of an embodiment for enriching the knowledge base with enrichment questions. The process may start at 402. Firstly, the process may access or get the configured level of risk, i.e., risk level which may be associated to, e.g., the user profile or the access to specific services and/or data of the computing system. Next, 406, the system/process may choose a set of question(s) from an account table within the knowledge base relating to the user profile which is sufficient to be compliant with the risk level.

In a next step, 408, the system may determine the configured degree of account enrichment. This may involve presenting one or more enrichment questions to the user and derive/determine the related facts from these enrichment questions. This may be expressed in block 410, indicating to choose a set of questions from the shared library—in particular the shared library of/with the other users/profiles—to increase the knowledge base of the account according to the enrichment degree. This way, the information, i.e., facts about a user stored in the knowledge base and/or linked to the user profile grows, which in turn means a higher level of access security to the computing system. The questions to be presented to the user for a next conversation, i.e., chat for granting access, will be kept, 412, in a random order ready for the next interaction, i.e., access attempt, with the user.

As discussed, the facts may have assigned weight factor values. However, the answers may also have weight factor values assigned to them, e.g., in the form of a trustworthiness of the answer given.

FIG. 5 block diagram of an embodiment of the authentication phase 500 of the process, which starts at 502. Next, 504, a question from ongoing questions chosen for this account conversation is supplied. The answer will be received, 506, and it will be determined whether it is an authentication question, 508. In case of "no"—case "N"—the question and the related answer is kept, i.e., stored, 510, in order to enrich the account information.

In case of "yes"—"Y"—it is determined, 512 whether the answer is correct. In case of no—case "N"—the answer as well as the related question is also stored, 513, for further investigations.

If the answer is correct at the previous determination, 512,—case "Y"—the ongoing success of a series of questions is tracked, 514, based on the weight of the individual questions. After a determination 516 whether this was the last question for the authentication process, the process either returns back to the beginning and supplies a next question, 504, or, the authentication process continues with a determination, 518, whether all answers have been 100% correct. If that is the case—"Y"—the access is granted, 520, and the knowledge about the account will be enhanced with all the answers that were previously kept, 522.

If the success rate at the determination 518 was not 100%—"N"—a next determination 524 examines whether the answers have been correct at least for a certain percentage and whether this percentage lies within a predefined risk level. If that is the case—"Y"—a limited access to the services of the computer system is granted (526). If the percentage of correct answers is below the percentage level for the predefined risk level, the account is not authorized to access the computing system and the related services (528); the access is denied.

FIG. 6 shows the dynamic user authentication system 600 for dynamically authenticating and granting access to a computing system. The system 600 includes a receiving unit 602 adapted for receiving text data, a natural language processing (NLP) unit 604 operable for identifying at least one fact comprised in the text data, and a knowledge base module 606 operable for storing the identified fact and relating to a user profile. Additionally, the system 600 includes a deriving module 608 adapted for deriving at least one authentication question from the stored fact, a chat module 610 adapted for conducting a textual authentication dialog. For this, the chat module operable for presenting the at least one authentication question, receiving a response, analyzing the response using the natural language processing capabilities of the NLP unit 604, and determining, based on the analysis, whether the response includes the stored fact from which the authentication question has been derived.

Furthermore, the system 600 includes a granting unit 612 adapted for granting access to the computing system. It may also be noted that the chat module 608 is also adapted for presenting at least one enrichment question and receiving the related answer(s). The enrichment question and related answer, i.e., fact is then used to enrich the knowledge base for the specific user, as well as increase the number of potential questions which may be shared in the authorization/enrichment process of other users.

Embodiments of the invention may be implemented together with virtually any type of computer, regardless of the platform being suitable for storing and/or executing program code. FIG. 7 shows, as an example, a computing system 700 suitable for executing program code related to the proposed method.

The computing system 700 is only one example of a suitable computer system and is not intended to suggest any limitation as to the scope of use or functionality of embodiments of the invention described herein. Regardless, computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 700 is shown in the form of a general-purpose computing device. The components of computer system/server 700 may include, but are not limited to, one or more processors or processing units 702, a system memory 704, and a bus 706 that couples various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limitation, as well as an operating system, one or more application programs, other program modules, and program data. Each of the operating system, one or more application programs, other program modules, and program data or some combination thereof, may include an implementation of a networking environment. Program modules 716 generally carry out the functions and/or methodologies of embodiments of the invention as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of computer system/server 700 via bus 706. It should be understood that although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, the dynamic user authentication system 600 may be attached to the bus system 706.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 100 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic user authentication system 96. Dynamic user authentication system 96 may relate to dynamically authenticating and granting access to a computing system.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

What is claimed is:

1. A method for dynamically authenticating and granting access to a computing system, the method comprising:
   deriving one or more authentication questions from one or more identified facts contained in a received text data, wherein the one or more identified facts are stored in a knowledge base relating to a user profile;
   presenting an enrichment question, wherein the enrichment question is a question shared from another user profile different from the user profile, and receiving a related answer;
   conducting a textual authentication dialog, wherein the textual authentication dialog comprises:
      presenting a number of the one or more authentication questions, wherein the number is based on a predefined risk level associated with the user profile; and
      determining, based on natural language processing, that received respective responses comprise at least one identified fact of the one or more identified facts; and
   granting access to the computing system based on the textual authentication dialog, wherein access to the computing system is limited based on a percentage of the received respective responses being correct.

2. The method of claim 1, wherein natural language processing is performed on the received text data to determine whether a length of the received text data exceeds a predefined threshold length.

3. The method of claim 1, wherein natural language processing is performed on the received text data to determine whether a number of identified facts exceeds a fact threshold number.

4. The method of claim 1, wherein the knowledge base is separated from the computing system.

5. The method of claim 1, wherein the natural language processing comprises using a cognitive computing system based on question answering technology.

6. The method of claim 1, wherein the granting access to the computing system comprises granting access according to an access level corresponding to a predefined risk level.

7. The method of claim 1, further comprising controlling the granting access according to an access level depending on a sum of weight factors of correctly received responses.

8. The method of claim 1, wherein at least one of the authentication questions comprises the enrichment question.

9. The method of claim 1, wherein the authentication question is of a type selected from the group consisting of a Boolean type question, a multiple-choice type question, and a phrase type question.

10. The method of claim 1, wherein receiving the text data and presenting the authentication question and receiving the response is performed using data of a type selected from the group consisting of audio data and chat data.

11. A computer system for dynamically authenticating and granting user access to a computing system, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, the program instructions comprising:
      program instructions to derive one or more authentication questions from one or more identified facts contained in a received text data, wherein the one or more identified facts are stored in a knowledge base relating to a user profile;
      program instructions to present an enrichment question, wherein the enrichment question is a question shared from another user profile different from the user profile, and receive a related answer;
      program instructions to conduct a textual authentication dialog, wherein the textual authentication dialog comprises:
         program instructions to present a number of the one or more authentication questions, wherein the number is based on a predefined risk level associated with the user profile; and
         program instructions to determine, based on natural language processing, that received respective responses comprises at least one identified fact of the one or more identified facts; and
      program instructions to grant access to the computing system, based on the textual authentication dialog, wherein access to the computing system is limited based on a percentage of the received respective responses being correct.

12. The computer system of claim 11, wherein the knowledge base is separated from the computing system.

13. The computer system of claim 11, wherein the natural language processing comprises using a cognitive computing system based on question answering technology.

14. The computer system of claim 11, wherein granting access to the computing system comprises granting access according to an access level corresponding to a predefined risk level.

15. The computer system of claim 11, further comprising:
   program instructions to control granting access to the computing system according to an access level depending on a sum of weight factors of correctly received responses.

16. The computer system of claim 11, wherein at least one of the authentication questions comprises the enrichment question.

17. The computer system of claim 11, wherein the authentication question is of a type selected from the group consisting of a Boolean type question, a multiple-choice type question, and a phrase type question.

18. A computer program product for dynamically authenticating and granting access to a computing system, the computer program product comprising:
   one or more non-transitory computer-readable storage medium having program instructions embodied therewith, the program instructions executable by a computer, the program instructions comprising:
      program instructions to derive one or more authentication questions from one or more identified facts contained in a received text data, wherein the one or more identified facts are stored in a knowledge base relating to a user profile;
      program instructions to present an enrichment question, wherein the enrichment question is a question shared from another user profile different from the user profile, and receive a related answer;
      program instructions to conduct a textual authentication dialog, wherein the textual authentication dialog comprises:

program instructions to present a number of the one or more authentication questions, wherein the number is based on a predefined risk level associated with the user profile; and program instructions to determine, based on natural language processing, that received respective responses comprise at least one identified fact of the one or more identified facts; and program instructions to grant access to the computing system based on the textual authentication dialog, wherein access to the computing system is limited based on a percentage of the received respective responses being correct.

\* \* \* \* \*